Oct. 25, 1927.
B. MORGAN
1,647,011
AUTOMOBILE HEADLIGHT
Filed April 13, 1926
2 Sheets-Sheet 1
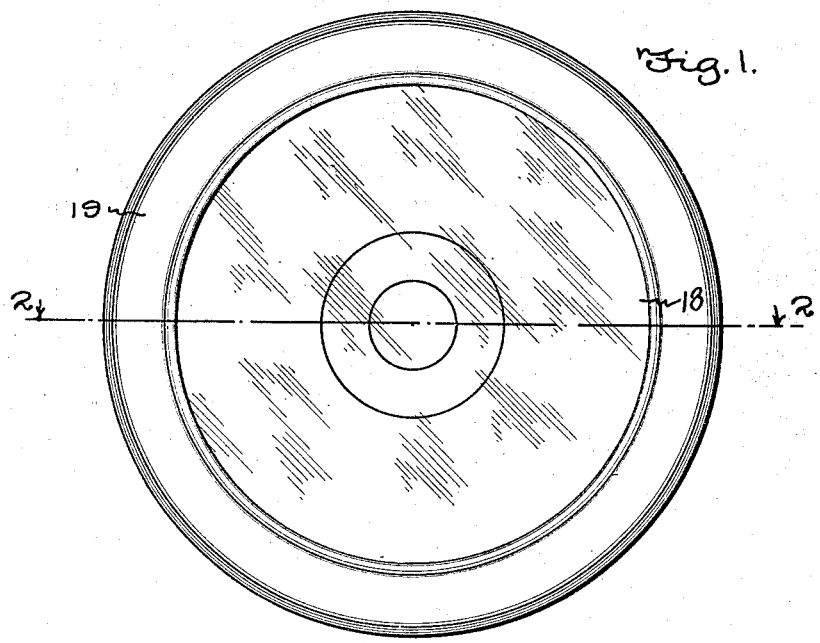
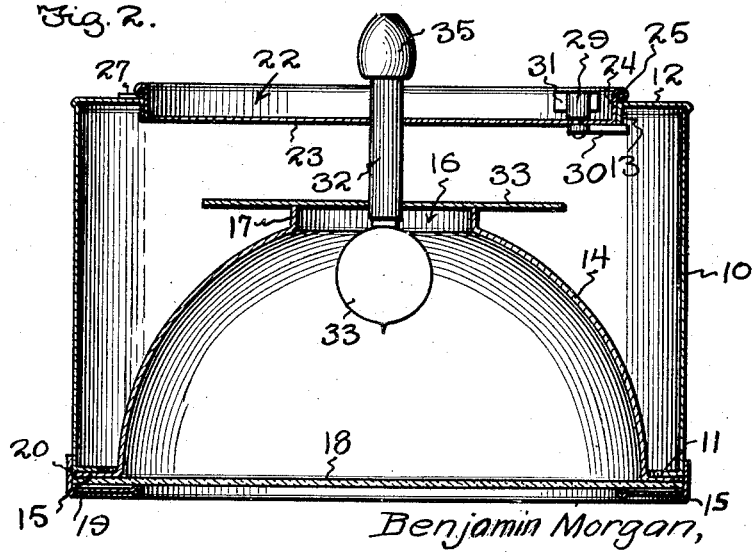
Benjamin Morgan, Inventor Oct. 25, 1927. 1,647,011
B. MORGAN
AUTOMOBILE HEADLIGHT
Filed April 13, 1926 2 Sheets-Sheet 2

Benjamin Morgan, Inventor

Patented Oct. 25, 1927.

1,647,011

UNITED STATES PATENT OFFICE.

BENJAMIN MORGAN, OF SHADYSIDE, OHIO.

AUTOMOBILE HEADLIGHT.

Application filed April 13, 1926. Serial No. 101,797.

This invention appertains generally to new and useful improvements in headlights for automobiles and the like and has for its primary object the provision of such a headlight so constructed that it may be also used to illuminate the rear of the machine with which it is associated when such is found to be desirable as when it is necessary to change a rear tire at night.

Another object of the present invention is to provide such a headlight of the character stated so constructed and arranged that the incandescent lamp used therein may be quickly and easily removed should it be worn out and another inserted in lieu thereof.

A further object of the present invention is the provision of such a headlight of the character stated wherein the incandescent lamp may be removed without the necessity of first removing the headlight lens as is usually the case.

A still further object of the present invention is the provision of such a headlight of the character stated which while simple in construction, is nevertheless strong, sturdy and durable, practical and efficient in its application, cheap to manufacture and well designed for the purposes for which it is intended.

With these and numerous other objects in view, the invention resides in the novel construction, combination and arrangement of parts to be more fully hereinafter described, illustrated in the accompanying drawings and particularly pointed out in the appended claims.

In the drawings forming a part of this application and wherein like characters of reference denote corresponding parts throughout the several views:

Figure 1 is a front view, in elevation, of a headlight constructed in accordance with the present invention.

Figure 2 is a sectional view taken on line 2—2 of Figure 1.

Figure 3:
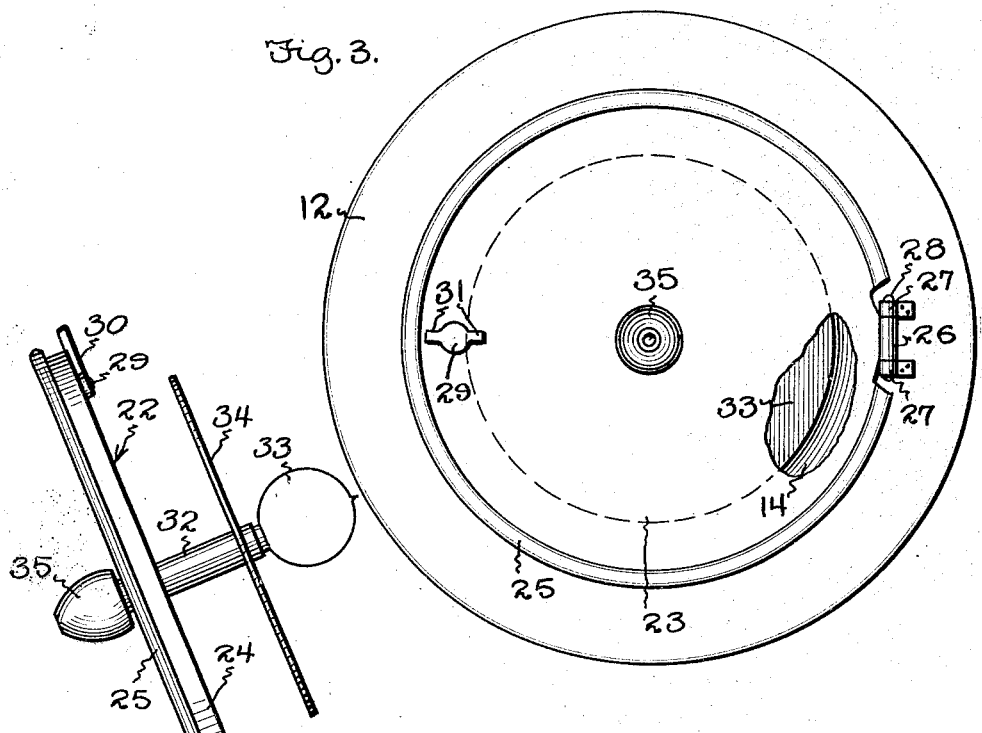
Figure 3 is a rear view of the headlight, partially broken away.

Reference now being had more particularly to the accompanying drawings wherein for the purpose of illustration has been disclosed a preferred embodiment of the present invention, it will be seen that the present improved headlight comprises in its construction an open-ended drum 10, provided at its forward end with the inwardly directed annular flange 11 and at its rear end with a similar flange 12, it being noted, however, that the flange 12 is somewhat wider than the flange 11 and is provided with the inwardly directed annular shoulder 13 which extends parallel with the wall of the drum 10.

Arranged within the drum 10 is a parabolic reflector 14, provided at its forward end with the laterally directed annular lip 15 which overlaps and abuts the outer surface of the flange 11 and terminates flush with the outer edge of the drum 10. The inner reduced end of the reflector 14 is provided with an opening 16 and surrounding this opening is the annular shoulder or extension 17 formed integrally with the said reflector 14.

Adapted to be positioned in front of the reflector 14 and to engage the outer surface of the flange 15 thereof is the usual glass or other transparent headlight lens 18, said lens being secured in position through the medium of the securing ring 19 provided with the annular flange 20 which encircles the wall of the drum 10, said flange being formed with one or more bayonet slots 20' to receive pins 21 carried by the said drum 10. The present invention, however, does not relate to the manner of securing the lens 18 in place and consequently it is to be understood that any desired means may be employed for this purpose.

Arranged to be fitted within the rear end of the drum 10 is a door 22 comprising the circular base plate 23 provided with the rearwardly directed peripheral flange 24 which projects beyond the flange 12 and is rolled or turned at its outer end to provide the stop bead 25, it being noted that the door 22 is adapted to fit snugly within the opening in the rear end of the drum with the flange 24 snugly engaging the shoulder 13 while the stop bead 25 is arranged to abut the outer surface of the flange 12. The bead 25 is provided with a hinge section 26 adapted to be positioned between and in alinement with the complementary hinge sections 27 carried by the flange 12 and a pivot pin 28 is inserted through the said hinge sections, whereby the door will be hingedly connected to the flange 12 and will be permitted to swing outwardly.

Carried by the circular base plate 23 of the door 22 at a point diametrically opposite the hinge, is a rotatable pin 29 inserted through the base plate 23 and having secured to its inner end the latch arm 30 while the outer end of the pin is provided with the finger engaging portions 31. Thus, it will be readily seen that when it is desired to lock the door in closed position, it is only necessary to rotate the pin 29 until the latch arm 30 thereof engages the inner edge of the shoulder 13. When it is desired to open the door 22, however, it is only necessary to rotate the pin 29 until the latch arm 30 thereof is swung out of engagement with the said shoulder 13.

Carried by and disposed centrally through the base plate 23 of the door 22 is the elongated lamp socket 32 carrying the incandescent lamp 33 at its inner end, which lamp is disposed through the opening 16 in the rear of the reflector 14. Carried by the lamp socket 32 adjacent the inner end thereof is a reflector plate 33 extending at right angles to the said lamp socket and adapted when the door 22 is closed, to abut the outer end of the shoulder 17 whereby to close the opening 16, as will be clearly seen upon reference to Figure 2 of the drawings. Suitable electric wires are, of course, arranged to be secured within the outer end 35 of the lamp socket 32 whereby to convey electric current to the lamp 33.

From the foregoing, it will be readily appreciated that the present improved headlight can be used to perform a dual purpose in that it can be used to illuminate the road in front of the machine while again, it may be employed to illuminate the rear of the machine such as when it may be found necessary to change a rear tire at night or when other repairs to the rear of the machine may have to be made. In order to illuminate the rear of the machine, it is only necessary to swing the door outwardly and rearwardly about its pivot 28 whereupon the incandescent lamp will be directed toward the rear of the machine to throw light thereon, the reflector plate 33 aiding in the directing of this light.

Figure 4:
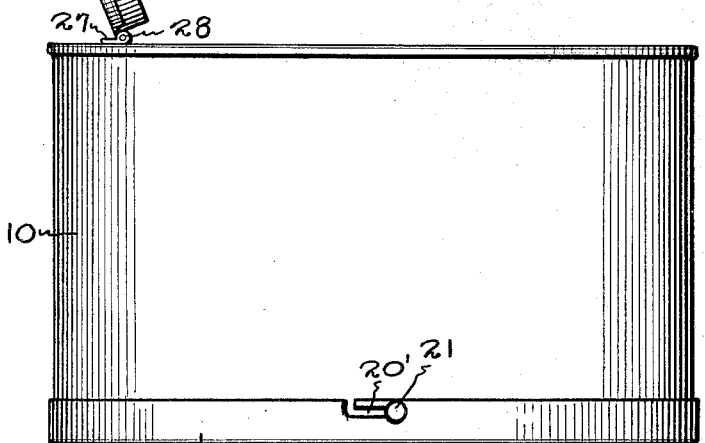
Figure 4 is an top view showing the position of the light when it is desired to illuminate the rear of the machine.

Again, when it is desired to remove the incandescent lamp 33 and insert another one in its place, the door can be swung on its pivot as shown in Figure 4 whereupon the incandescent lamp can be very easily and quickly removed. This construction thus eliminates the usual trouble and inconvenience which ordinarily results in the changing of the incandescent lamps when it is necessary to first remove the retaining band 19 and the lens 18.

While there has been shown and described a preferred embodiment of the present invention, it is to be understood that the same is susceptible of modifications in various particulars and that any such modifications as properly fall within the scope of the appended claims may be resorted to without departing from or sacrificing the spirit of the invention.

What is claimed is:

1. In a headlight structure of the character described a drum member having each end provided with inwardly directed annular flanges, one of said flanges having its inner edge turned inwardly to provide an annular rim extending substantially parallel with the side wall of the drum, a reflector body of substantially parabolic contour positioned within the drum and having the forward edge thereof secured to the other one of said flanges, said reflector body having the central rear portion thereof provided with a relatively large aperture and further being turned outwardly to set up an annular flange, a door member hingedly secured to the other one of the inwardly directed flanges of said casing and bearing against said rim, when in closed position, an elongated incandescent lamp socket projecting through the diametrical center of said door and designed, when the door is closed, to project into said reflector body, and a disc light member of materially greater diameter than the aperture of said reflector body and having the forward face thereof formed to set up a reflecting surface, mounted upon the forward end of said incandescent light socket and adapted to be brought to position against the annular flange of said parabolic reflector to close the aperture in the rear portion thereof, said incandescent lamp socket and reflector disc carried thereby swinging outwardly of the casing upon the opening of said door member.

2. In a headlight structure of the character described, a drum member having one end provided with an inwardly directed annular flange having its inner edge turned inwardly to provide an annular rim extending substantially parallel with the side wall of the drum, a reflector body of substantially parabolic contour positioned within the drum and opening through the other end thereof, said reflector body having the central rear portion provided with a relatively large aperture, a door member hingedly secured to said flange and bearing against said rim when in closed position, an incandescent lamp socket projecting through the diametrical center of said door and designed, when the door is closed, to project into said reflector body, and a disc light member of materially greater diameter than the aperture of said reflector body and having the forward face thereof formed to set up a reflecting surface, mounted upon the forward end of said incandescent light socket and adapted to be brought to position against the edge of said aperture to close the same, said incandescent lamp socket and reflector disc carried thereby swinging outwardly of the casing upon the opening of said door member.

In testimony whereof I affix my signature.

BENJAMIN MORGAN.